Oct. 21, 1952     J. C. MILNE     2,615,066
DIRECT CURRENT ELECTRICAL SUPPLY SYSTEM

Filed July 7, 1950     3 Sheets-Sheet 1

Inventor
John C. Milne
By Ralph B. Stewart
Attorney

Inventor
John C. Milne
By Ralph B. Stewart
Attorney

Oct. 21, 1952 J. C. MILNE 2,615,066
DIRECT CURRENT ELECTRICAL SUPPLY SYSTEM
Filed July 7, 1950 3 Sheets-Sheet 3

Inventor
John C. Milne
By Ralph B. Stewart
Attorney

Patented Oct. 21, 1952

2,615,066

UNITED STATES PATENT OFFICE 2,615,066

DIRECT CURRENT ELECTRICAL SUPPLY SYSTEM

John Charles Milne, Wolverhampton, England, assignor to The Electric Construction Company Limited, Wolverhampton, England, a company of Great Britain Application July 7, 1950, Serial No. 172,506
In Great Britain July 12, 1949

14 Claims. (Cl. 171—97)

This invention relates to direct current electrical supply systems in which a battery is connected to float across the output terminals of the system in order to supply the load in the event of an emergency.

One use for systems of this kind is to supply telephone exchanges in which there may be very large fluctuations of load during the course of a 24-hour period. Despite these fluctuations of load, it is important to maintain the output voltage of the system substantially constant, both from the point of view of the operation of the exchange and in order to maintain the current flowing to or from the battery at a small value. Even if the load does not call for a substantially constant voltage, this second consideration is of importance in conserving the life of the battery by reducing the work required from it to a minimum.

Such systems may supply the load either with rectified current from an alternating current mains supply, or alternatively from a direct current generator, but in either case the system is inherently susceptible to variation of voltage with fluctuation of the load. In present equipments utilising a direct current generator, the usual practice is to control the generator by an electro-magnetic relay, to which the generator voltage is applied. Such relays are, however, usually only sensitive to variations in voltage of about 1 per cent above or below the standard voltage and they are usually arranged to increase the generator output as the load increases and the voltage falls. However, because of the fact that the voltage relay is not very sensitive, discharge and charging currents from and to the battery of quite considerable magnitudes are caused to flow. For example, in the case of a 2000 ampere-hour battery supplying an exchange requiring 400 amperes, there may be a current to or from the battery of 250 amperes, which rapidly decreases to about 40 amperes.

The object of the present invention is to make available a supply system which is very sensitive to changes of load and does not require a relay with contacts and avoids any sudden change in regulating conditions.

According to the invention, therefore, the current flowing to or from the battery is used to increase or decrease, depending on the direction of that current, the magnetization of the cores of a pair of choke coils, the alternating current windings of which are arranged so that, during any half cycle of an alternating current flowing through them in series, the magnetization of one of the cores is increased while that of the other is decreased, the battery current thus serving, by variation of the inductance of the alternating current windings, to control the value of the alternating current. A rectified component of this alternating current is then used either directly or indirectly to regulate the output voltage of the system so as to maintain the battery current at a low value when the battery is at a normal state of charge.

If the load is supplied from the system with rectified current from an alternating current mains supply, the alternating current flowing through the alternating current windings may itself directly supply a rectifier providing at least part of the direct current output voltage of the system and thus serve directly to control that output voltage. On the other hand, however, if the system supplies the load through a direct current generator, the rectified component of the alternating current is then used to control the field excitation of the generator, either directly or by controlling a separate exciter machine supplying the main field of the generator. If the rectified component of the alternating current is to control the field of the generator directly, it may either be supplied to the main field winding of the generator or alternatively to an auxiliary field winding acting in conjunction with the main field winding.

It will be understood that in the case of a supply system using a direct current generator, the control is carried out in two stages, the first stage consisting of the control of the field excitation by means of the rectified component of the alternating current, and the second stage consisting of the control of the output of the generator by means of the field excitation. A similar form of two-stage control may be employed when the load is supplied with rectified current from an alternating current mains supply. In this latter case, the rectified component of the alternating current flowing through the alternating current windings of the choke coils is used to regulate the magnetization of the cores of a further pair of coke coils connected in series, so as to control the inductance of their alternating current windings, which bear the same relationship to one another as those of the first pair of coils. The inductance of these windings in its turn serves to control the value of a current flowing through the windings from an alternating current mains source and a rectified component of this latter current is used to provide at least part of the direct current output voltage of the system.

In a simple form of system, this rectified component may supply the total output of the system but, in order to avoid the necassity for controlling the value of a relatively large current, the rectified component may be used merely to boost the voltage of the rectified component of a further current drawn from the alternating current main source and supplying a large proportion of the load. Thus again the two-stage control system is used, the first stage consisting of the control of the inductance of the alternating current windings of the further pair of choke coils, and the second stage consisting of the control of the current flowing through those coils in accordance with the change of inductance.

Whether there are two stages of control or only one stage, the magnetization of the cores of the choke coils used in the first stage is raised to a predetermined value by means of saturating bias windings supplied with a substantially constant direct current. The value of this current is chosen so that the magnetization of the cores is raised to a level slightly below that corresponding to the knee of the saturation curve. The result of this is that during any half cycle of the alternating current flowing in the choke coils, the magnetization of one core is increased to the saturation value, which, on account of the existing level of the magnetization, represents only a small increase, with a consequent decrease in the inductance. However, by reason of the relationship between the two sets of alternating current windings, the magnetization of the other core is decreased by a considerably larger amount, while its inductance is not appreciably changed. Thus it will be understood that the total inductance of the two coils connected in series will be controlled by the level of magnetization produced by the saturating bias windings since, the closer this level approaches the knee of the saturation curve, so the less the total inductance of the two coils becomes.

In addition to the saturating bias windings each of the choke coils is provided with a control winding supplied with the current flowing to or from the battery. Thus, according to the direction of flow of the battery current, so these control windings serve to raise or lower the level of magnetization established by the saturating bias windings and thus to lower or raise the inductance of the coils.

On the other hand, however, the control may be arranged so that an increase of the alternating current flowing through the choke coils tends to reduce the output voltage of the system, for example by supplying an auxiliary field connected in opposition to the main field of a direct current generator. In this case, of course, the effect of the control windings has to be reversed accordingly.

As described so far, the purpose of the control of the system has been to reduce the current flowing to or from the battery to a small value so as to conserve the life of the battery. If, however, the battery becomes discharged owing, for example, to its use in an emergency, it is, of course, necessary, not to reduce this current to a small value, but to arrange that the mean value of the current flowing to the battery represents a suitable rate of charge for the battery. In order to achieve this, it is necessary to boost the output voltage of the system slightly above its normal value and this may be brought about by a suitable adjustment of the inductance of the choke coils. For this reason the current in the saturating bias windings of the choke coils may be made adjustable so as to set the predetermined value of the magnetization of the cores so as to adjust the mean battery current to the state of charge of the battery.

The regulation of the battery charging current in accordance with the state of charge of the battery may, however, be made automatic by the provision of yet a further set of windings on the cores of the choke coils. These windings are arranged to oppose the effect of the saturating bias windings and include in their circuit a resistance having a non-linear current-voltage characteristic. The windings are energised directly from the battery itself so that, as the battery voltage rises, the current through the windings rises disproportionately, owing to the provision of the non-linear resistance, and thus opposes the saturating bias windings to a greater extent so as to reduce the magnetization of the cores, increase the inductance of the coils and thus automatically reduce the output voltage of the system to correspond with the new state of charge of the battery.

In order that the nature of the invention may be more fully understood, three forms of electrical supply system in accordance with the invention will now be described with reference to the accompanying drawings, in which.

Figure 1:
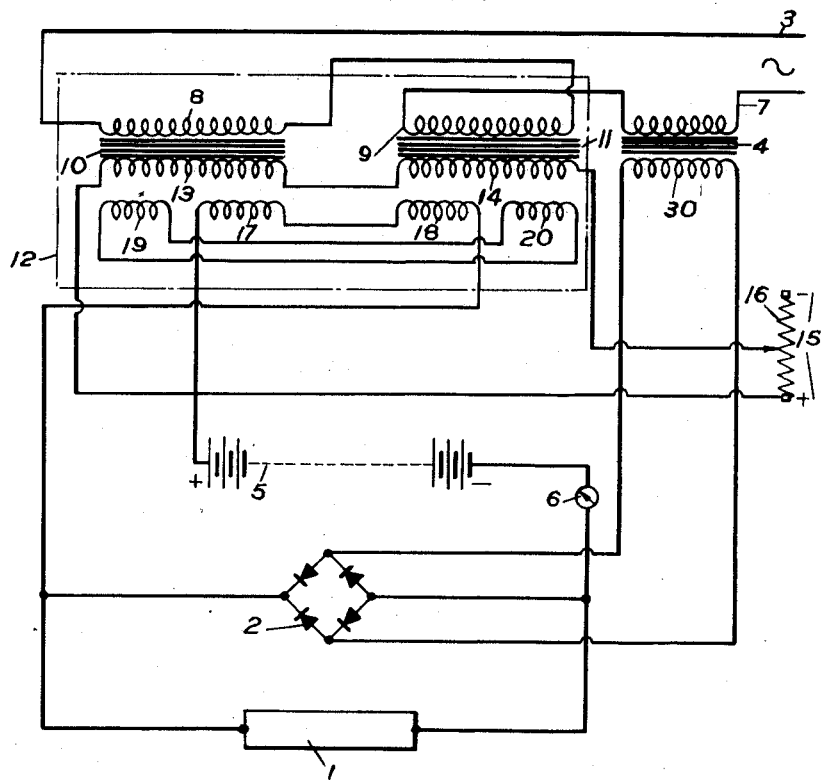
Figure 1 shows a system in which the load is supplied directly from a rectifier having a single stage of control.

Referring first to Figure 1, it will be seen that the load 1 is supplied directly from a full wave rectifier 2 supplied from alternating current supply mains 3 by way of a transformer 4. A battery 5 is connected to float across the load 1 and an ammeter 6 is provided to indicate the current flowing to or from the battery. The current flowing in the primary winding 7 of the transformer 4, and consequently also that flowing in the secondary winding 30, is controlled by the oppositely connected alternating current windings 8 and 9 of a pair of choke coils connected in series with the primary winding 7 across the main supply 3. These windings 8 and 9 are wound on saturable cores 10 and 11 respectively, which with their various windings, together form a single amplifying unit enclosed within the broken line 12.

The datum level of the magnetization of the cores 10 and 11 is provided by means of two saturating bias windings 13 and 14 connected in series with one another across a source of direct current potential 15 bridged by a potentiometer resistance 16 so that the level of magnetization of the cores may be adjusted manually. In addition to the saturating bias windings 13 and 14, the cores are provided with a pair of control windings 17 and 18 respectively, connected in series with one another between the positive terminal of the battery 5 and the load 1. Thus any current flowing to or from the battery also flows through the control windings 17 and 18 so as either to oppose or assist respectively the saturating bias windings 13 and 14.

If, due to fluctuation of load, the output voltage of the system tends to rise, a charging current will start to flow into the battery. This will oppose the effect of the saturating bias windings and serve to decrease the magnetization of the cores 10 and 11 and increase the inductance of the windings 8 and 9. Thus the current flowing through the primary winding 7 of the transformer 4 will be reduced, reducing also the output of the rectifier 2 and hence the output voltage of the system. In this way any charging current flowing into the battery will automatically tend to reduce the output voltage of the system so as to restore a state of equilibrium. In the same way, a discharge current from the battery will tend to boost the output voltage of the system, again to reduce the battery current to a small value when the battery is in a state of normal charge. If, however, the battery becomes discharged so that it is desirable to provide a mean charging current to the battery, the current supplied to the saturating bias windings 13 and 14 is increased slightly so as to increase the magnetization of the cores, reduce the inductance of the coils and thus slightly raise the output voltage of the system to provide the necessary charging current.

In addition to the saturating bias windings and the control windings, a further pair of short-circuited windings 19 and 20 are also provided on the cores. The function of these windings is to cancel out harmonics induced in the alternating current circuit and appearing as a "noise" voltage across the load.

Figure 2:
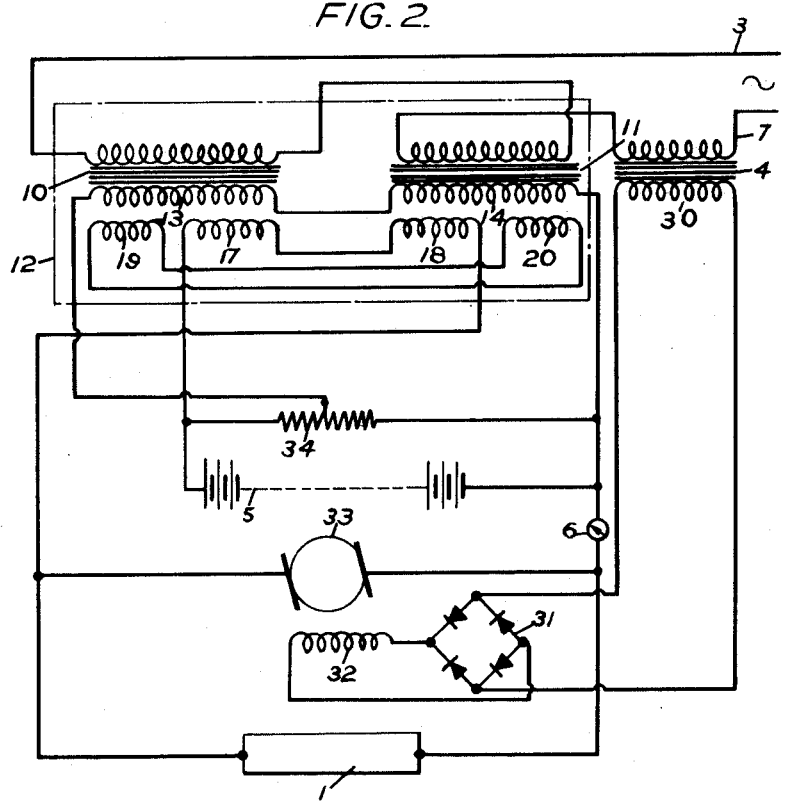
Figure 2 shows a system in which the load is supplied from a direct current generator.

The system shown in Figure 2 is similar to that shown in Figure 1 except that an additional stage of control is introduced. The amplifying unit 12 is exactly the same as that shown in Figure 1 and the alternating current windings 8 and 9 of the choke coils serve to control the current flowing in the primary winding 7 of a transformer 4 as before. In this case, however, the secondary winding 30 of the transformer supplies a rectifier 31 which, instead of supplying the load directly, supplies the field winding 32 of a direct current generator 33 which itself supplies the load 1.

A battery 5 is connected to float across the load in the same way as shown in Figure 1 and the battery current is again caused to flow through control windings 17 and 18. The saturating bias windings 13 and 14, however, instead of being supplied from an independent source of direct current are supplied directly from the substantially constant battery voltage, the current in these windings being adjustable by means of a potentiometer resistance 34.

The operation of this form of system is substantially the same as that shown in Figure 1. If, owing to an increase of the output voltage of the system caused by a fluctuation of load, a charging current starts to flow into the battery, the control windings 17 and 18 increase the inductance of the windings 8 and 9 and thus decrease the output of the transformer 4 and hence the current flowing in the field winding 32. This in its turn reduces the voltage of the generator 33 which provides the output voltage of the system, and thus restores a state of equilibrium. Similarly, if a discharge current starts to flow from the battery, the field excitation of the generator is boosted so as again to restore the state of equilibrium. The main battery current may also be adjusted by means of the resistance 34 to correspond with the state of charge of the battery.

In Figure 2 the rectifier 31 has been shown for simplicity as supplying the main field winding 32 of the generator 33, but it is, of course, obvious that a number of alternatives are possible. For example, the rectifier 31 may be connected in series with a further source of direct current supplied by another rectifier; or may be shunted across the generator 33 itself so as to supply the main field winding 32. Again the rectifier 31 may merely supply an auxiliary field winding of the generator while the main field winding is constantly energised from an independent source of direct current. As a still further possibility, the rectifier 31 may control the field of an exciter machine supplying the main field winding of the generator 33.

Figure 3:
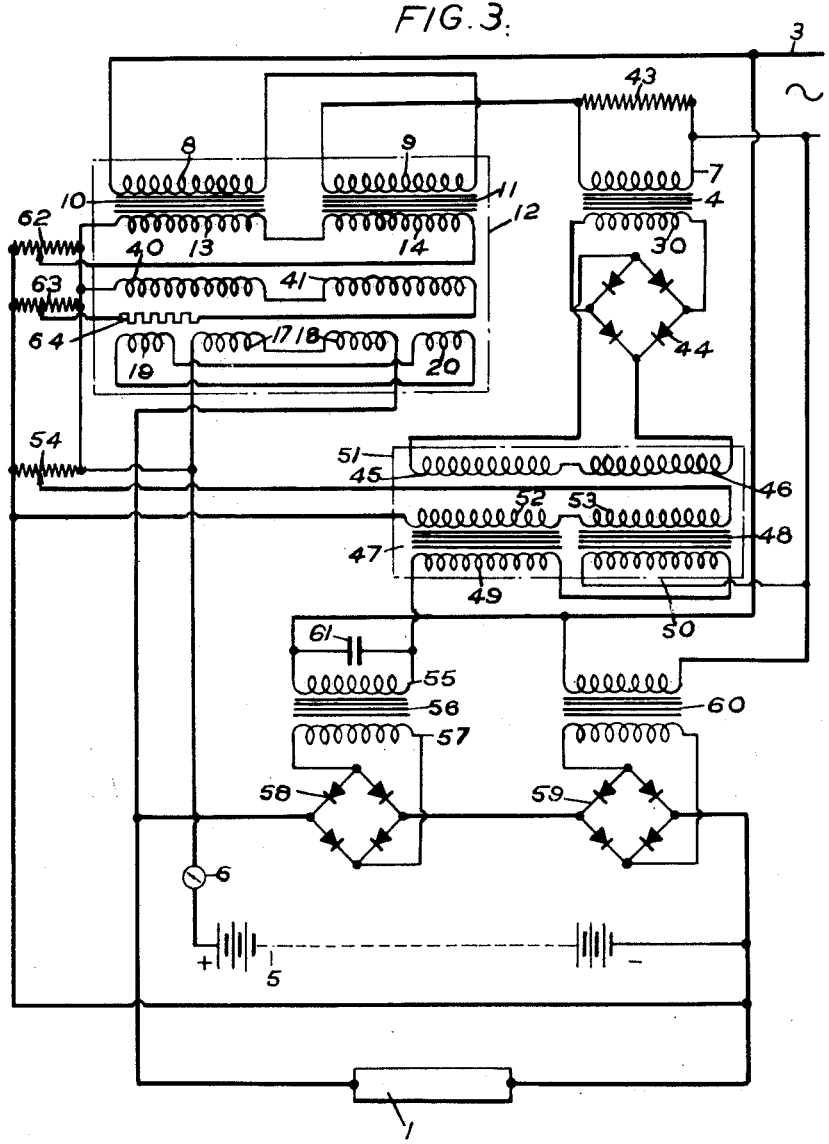
Figure 3 shows a system in which the load is supplied from two rectifiers in series, one of which is controlled by a two-stage control arrangement.

In the system shown in Figure 3, the load is supplied with rectified alternating current drawn from alternating current mains 3, but in this case the control is effected in two stages. The amplifying unit 12 is once again the same as that shown in Figures 1 and 2 with the exception that an additional set of windings 40 and 41 (to be described later) are provided for the cores 10 and 11 respectively of the choke coils. These choke coils control the current to the primary winding 7 of a transformer 4 in the same way as previously. Since the operation of the system depends on the cores becoming saturated during each alternate half cycle of the alternating current, the primary winding 7 is shunted by a resistance 43 to ensure that sufficient current flows in the alternating current windings to obtain saturation even under no-load conditions.

The output of the secondary winding 30 of the transformer is fed to a small rectifier 44 which is the equivalent of the rectifier 31 shown in Figure 2. This rectifier 44 supplies two sets of control windings 45 and 46 wound on the cores 47 and 48 of a further pair of choke coils 49 and 50 respectively, connected in opposition in the same way as the windings 8 and 9 and constituting a further amplifier unit indicated generally by the broken line 51. The level of the magnetization of these cores is set by saturating bias windings 52 and 53 supplied from the battery 5 by way of a potentiometer resistance 54 which is adjustable to vary the level of magnetization. The control windings 45 and 46 thus serve to assist the saturating bias windings 52 and 53 to a varying degree depending on the output of the rectifier 44.

The choke coils 49 and 50 control the current to the primary winding 55 of a transformer 56 of which the secondary winding 57 supplies a full-wave rectifier 58. The rectifier 58 is connected in series with a second rectifier 59 supplied directly from the alternating current mains supply by way of a transformer 60. Thus the output of the rectifier 59 is without control and is boosted to a varying extent by the controlled output of the rectifier 58. These two rectifiers in series thus provide the total output of the system to the load 1.

In operation, the output of the rectifier 44 is controlled in accordance with the battery current as already described in connection with the rectifier 31 shown in Figure 2. Thus when a charging current is flowing into the battery, the output of the rectifier 44 is decreased. This decreases the effect of the control windings 45 and 46 and serves to reduce the magnetization of the cores 47 and 48. This in its turn increases the inductance of the coils 49 and 50 and decreases the current in the primary winding 55 of the transformer 56, thus also decreasing the current in the secondary winding 57 and decreasing the boosting effect of the rectifier 58 so as to reduce the output voltage of the system and restore the battery current to its small equilibrium value.

The primary winding 55 of the transformer 56 is shunted by a condenser 61 which functions in the same manner as the resistance 43 to ensure saturation of the cores 47 and 48 under no-load conditions.

The function of the windings 40 and 41 in the amplifier 12 is to provide automatic regulation of the main current to the battery in accordance with the state of charge of the battery. The saturating bias windings 13 and 14 are supplied with voltage from the battery 5 by way of an adjustable potentiometer resistance 62. The windings 40 and 41 are connected to oppose the saturating bias windings 13 and 14 and are also supplied from the battery by way of an adjustable potentiometer resistance 63 while a resistance 64, having a current-voltage function, which is to the fourth power, is also included in the circuit of these windings. The effect of this resistance 64 is that for unit rise of battery voltage, producing unit rise of current in the saturating bias windings 13 and 14, the current in the windings 40 and 41 will increase four times. In other words, as the battery voltage builds up as the battery approaches the fully charged condition, so the effect of the windings 40 and 41 increases in opposing the saturating bias windings 13 and 14. This tends to decrease slightly the magnetization of the cores 10 and 11 and thus, by way of the two-stage control already described, to reduce the output voltage of the system and thus slowly reduce the charging current to the battery as the latter approaches a fully charged condition.

In the system just described the rectifier 58 is shown as serving merely to boost the output of the rectifier 59 which in general will supply the larger proportion of the load. If, however, a relatively small load is required, the rectifier 58 may be used alone as the main source of supply in much the same way as the rectifier 2 is used in the system shown in Figure 1. Similarly also, in that system shown in Figure 1, the rectifier 2 instead of supplying the load itself may be used to boost the output of one or more further rectifiers supplying the greater proportion of the load.

I claim:

1. A direct current electrical supply system comprising in combination a main supply rectifier, an electric battery connected in parallel with said rectifier, a source of alternating current supply connected to said rectifier, a magnetic amplifier comprising a pair of saturable choke coils each having an alternating current winding, a pre-setting winding and a control winding, said alternating current windings being connected in opposite directions in said alternating current supply to said rectifier, said control windings being connected to carry the current flowing to and from said battery and being operative to vary the impedance of said choke coils and thereby to adjust the voltage of said rectifier in a direction such as to oppose the said battery current, and adjustable means for supplying to said pre-setting windings a substantially constant but adjustable direct current.

2. A direct current electrical supply system comprising in combination a main source of direct current having a voltage control circuit, an electric battery connected in parallel with said source, a magnetic amplifier comprising a pair of saturable choke coils each having an alternating current winding, a pre-setting winding and a control winding, said alternating current windings being connected in series in said voltage control circuit for controlling the voltage of said main source, and said control windings being connected to carry the current flowing to and from said battery and being operative to vary the impedance of said alternating current windings and thereby to adjust the voltage of said main source in a direction such as to oppose the said battery current, and an adjustable means for supplying to said pre-setting windings a substantially constant but adjustable direct current.

3. A direct current electrical supply system according to claim 1, in which the current flowing through the alternating current windings of the choke coils also flows through the primary winding of a transformer, and the rectified component is derived from the secondary winding of that transformer.

4. A direct current electrical supply system according to claim 1, in which the cores of the choke coils are provided with short-circuited windings for the cancellation of harmonics generated in the coils.

5. A direct current electrical supply system according to claim 1, in which the cores of the coke coils are provided with a set of windings opposing the saturating pre-setting windings and energized from the battery and including in their circuit a resistance having a non-linear current-voltage characteristic serving to give a disproportionate rise of current with rise of battery voltage leading to automatic regulation of the battery charging current according to the state of charge of the battery.

6. A direct current electrical supply system according to claim 1, in which the rectified component of the alternating current is used to regulate the magnetization of the cores of a further pair of choke coils, the alternating current windings of which are also arranged so that, during any half cycle of an alternating current flowing through them in series, the magnetization of one of the cores is increased while that of the other is decreased, the rectified component thus serving, by variation of the inductance of the coils to control the value of the current flowing from an alternating current mains source through the two coils, and a rectified component of this latter current is used to provide at least part of the direct current output voltage of the system.

7. A direct current electrical supply system according to claim 6 wherein the rectified component of the current from the alternating current mains source is supplied in series with another rectified component from the alternating current mains source provide the total output of the system.

8. A direct current electrical supply system according to claim 7, in which the cores of the further pair of choke coils are provided with saturating bias windings supplied with direct current adjusted to a substantially constant value and the rectified component of the alternating current flowing through the first pair of choke coils also flows through additional control windings assisting the saturating bias windings to a varying degree according to the magnitude of the rectified component and thus serving to vary the inductance of the further pair of coils.

9. A direct current electrical supply system according to claim 8, in which the current from the alternating current mains source is caused to flow through the primary winding of a transformer shunted by a condenser and the current in the secondary winding of the transformer is rectified to provide the said rectified component.

10. A direct current supply system comprising a source of alternating current, a rectifier and a saturable reactor connected in series relation across said source, a pair of output terminals for said system, means controlled by said rectifier for impressing direct current voltage across said terminals of a value which varies in accordance with the output voltage of said rectifier, a battery connected across said output terminals for supplying current to said system when the battery voltage exceeds said impressed voltage and for receiving a charging current from said system when the impressed voltage exceeds the battery voltage, adjustable biasing means normally magnetizing the core of said reactor in one direction at a constant but adjustable value, and means responsive to current flowing through said battery for decreasing the magnetization of said core upon the flowing of charging current and for increasing the magnetization upon the flow of discharging current.

11. A direct current electrical supply system comprising in combination a main direct current supply generator, an electric battery connected in parallel with said generator, a source of alternating current, a rectifier supplied with said alternating current and serving to control the field excitation of said generator, a magnetic amplifier comprising a pair of saturable choke coils each having an alternating current winding, a pre-setting winding and a control winding, said alternating current windings being connected in opposite directions in said alternating current supply to said rectifier, said control windings being connected to carry the current flowing to and from said battery and being operative to vary the impedance of said choke coils and thereby to adjust the voltage of said generator in a direction such as to oppose the said battery current, and adjustable means for supplying to said presetting windings a substantially constant but adjustable direct current.

12. A direct current electrical supply system as claimed in claim 11, in which said rectifier supplies current to the main field winding of said generator.

13. A direct current electrical supply system as claimed in claim 11, in which said rectifier supplies current to an auxiliary winding of said generator.

14. A direct current electrical supply system comprising in combination, a source of alternating current, a main supply rectifier fed from said source, an electric battery connected in parallel with said main rectifier, a first magnetic amplifier comprising a pair of choke coils each having an alternating current winding, a pre-setting winding and a control winding, a second rectifier energized from said source of alternating current, the input to said second rectifier being controlled by said alternating current windings of said first magnetic amplifier, an adjustable source of direct current for supplying said pre-setting windings, a second magnetic amplifier comprising a pair of alternating current windings connected in the energizing circuit of said main rectifier, a pair of pre-setting windings, and a pair of control windings supplied from said second rectifier; and a second adjustable source of direct current for energizing said pre-setting windings of said second magnetic amplifier, said control windings of said first magnetic amplifier being connected to carry the current flowing to and from said battery and being operative to vary the impedance of said alternating current windings of said first magnetic amplifier and thereby to control the input to said control windings of said second magnetic amplifier and thereby to adjust the voltage of said main rectifier in a direction to oppose the said battery current.

JOHN CHARLES MILNE.

No references cited.